L. A. CARPENTER & R. MIDDLETON.
PIPE HANGER.
APPLICATION FILED OCT. 31, 1908.

992,338.

Patented May 16, 1911.

WITNESSES
A. T. Palmer
J. Murphy

INVENTORS.
Lewis A. Carpenter
Richard Middleton
by Jas. H. Churchill
Atty.

UNITED STATES PATENT OFFICE.

LEWIS A. CARPENTER AND RICHARD MIDDLETON, OF REVERE, MASSACHUSETTS.

PIPE-HANGER.

992,338.  Specification of Letters Patent.  Patented May 16, 1911.

Application filed October 31, 1908. Serial No. 460,513.

*To all whom it may concern:*

Be it known that we, LEWIS A. CARPENTER and RICHARD MIDDLETON, citizens of the United States, and residents of Revere, county of Suffolk, and State of Massachusetts, have invented an Improvement in Pipe-Hangers, of which the following description, in connection with the accompanying drawings, is a specification, like letters on the drawings representing like parts.

This invention relates to a hanger for pipes and like articles and is especially designed and adapted for use by plumbers, for attaching water and like pipes to ceilings, walls and like supports.

The present invention has for its object to provide a simple, strong and inexpensive hanger, which is composed of a minimum number of parts and can be quickly and easily applied to the pipe and secured in its operative position in a minimum time and with the least possible inconvenience to the plumber or other operator. To this end, the hanger is composed of a tubular member, which is designed to be secured to the ceiling or other support and is provided with substantially diametrically opposite slots extended longitudinally of said member, and a movable member comprising a substantially circular body portion to engage the pipe and curved arms extended substantially at right angles to said body portion, and designed to engage the tubular member referred to, said curved arms having holes for the passage of a screw or bolt, which also passes through the slots in the tubular member and serves to secure the two members of the hanger together. The screw or bolt may and preferably will engage screw-threads on the inner surface of the wall of one of the holes in an arm of the movable member as will be described. These and other features of this invention will be pointed out in the claims at the end of this specification.

Figure 2:
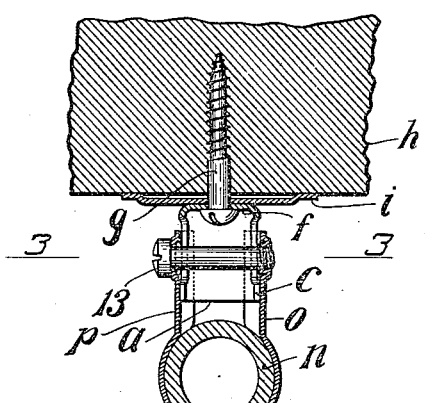
Figure 1:
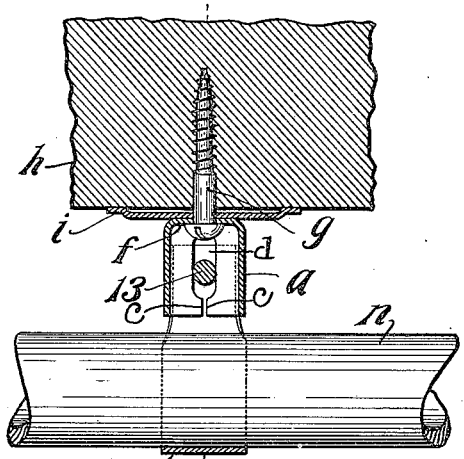
Figure 3:
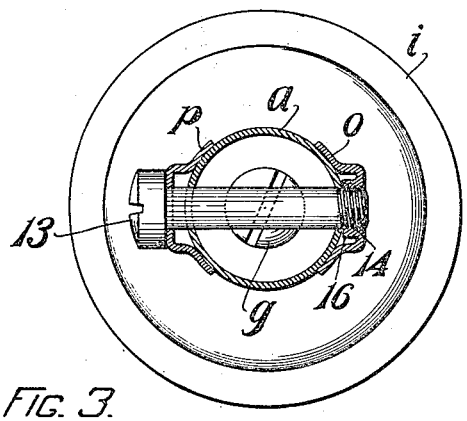
Figure 4:
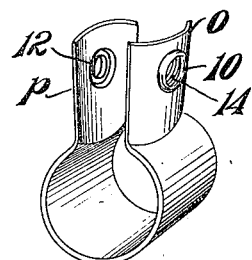
Figure 5:
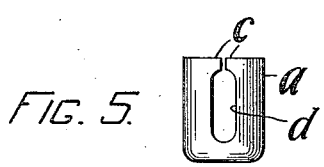

Figure 1 is a side elevation and section of a pipe supported by a hanger embodying this invention. Fig. 2, a cross section on the line 2—2, Fig. 1. Fig. 3, an enlarged section on the line 3—3, Fig. 2, looking up. Fig. 4, a detail of the movable member. Fig. 5, a detail of the stationary or tubular member, and Fig. 6, a plan of a blank from which the tubular member is formed.

Figure 6:
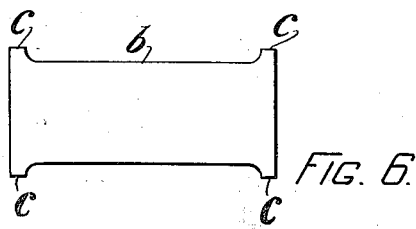

Referring to the drawings, $a$ represents the tubular member of the hanger, which may be made from the sheet metal blank $b$ shown in Fig. 6, said blank having lugs or ears $c$ at its ends on its opposite sides, which form end walls of diametrically opposite slots $d$ in the tubular member $a$ when the blank $b$ is drawn up or shaped, which may be accomplished by suitable tools or dies (not shown).

The lugs or ears $c$ in the tubular member $a$ are normally separated as represented in Fig. 5, so as to form a tubular member, which is split at one end and is capable of being contracted until the lugs or ears $c$ are brought into engagement for a purpose as will be described.

The tubular member $a$, which may be designated the stationary member of the hanger is provided with a head $f$ at one end having a hole through which a screw $g$ may be passed, and inserted into the ceiling $h$ or other support, said screw also preferably passing through a hole in a washer or bearing plate or disk $i$.

The stationary tubular member $a$ has co-operating with it a pipe engaging member, which may be designated the movable member of the hanger and which is made as shown in Fig. 4, preferably from sheet metal and comprising a substantially circular body portion $m$ to engage the pipe $n$ and curved arms $o$, $p$, extended from said body portion substantially at right angles thereto. The arms $o$, $p$ are given substantially the same curvature as the tubular member $a$, so as to embrace or engage the same on diametrically opposite sides, and said arms are provided with holes 10, 12, through which a screw or bolt 13 is extended. The hole 10 may and preferably will be provided with screw-threads 14 to be engaged by the threaded end of the bolt or screw 13, and in order to obtain a firm and sufficiently long engagement of the threaded end of the bolt with the arm $o$, the annular wall 16 of the opening 10 is drawn or bent inwardly as clearly represented in Fig. 3. While we may prefer this construction we do not desire to limit the invention in this respect, as the threaded end of the bolt may be engaged beyond the arm $o$ with a nut (not shown) but in a manner well understood.

In operation with the hanger herein shown, the tubular member $a$ is secured to the ceiling by the screw $g$ and the movable member is slipped under the pipe $n$, after which the arms o, p, are slipped into engagement with the tubular member with the holes 10, 12, registering with the slots d, after which the bolt 13 is passed through the hole 12 and the slots d and engaged with the threaded wall of the hole 10. The movable member with the bolt 13 secured thereto can then be moved longitudinally with relation to the tubular member a until the pipe has been properly adjusted with relation to the ceiling or support h and when so adjusted, the screw or bolt 13 may be set up so as to contract the diameter of the tubular member and effect a firm engagement therewith of the curved arms of the movable member.

The continuation of the tubular member a may be limited by the walls of one or both of the slots d engaging or biting the screw or bolt 13 or by the lugs c being brought together without the walls of the slot biting the screw. In either case, the tubular member at such time although split has the effect of a solid tubular member having a continuous circumference and forms a substantially solid supporting member for the curved arms o, p of the movable member to grip.

It will be observed that the hanger herein shown is capable of being quickly and easily applied as the operator has the free use of both hands, with one of which he can grasp the pipe and movable member and slip the curved arms of the latter into engagement with the tubular stationary member, and then insert the screw 13 through the hole 12, slots d and into the threaded hole 10, after which he can adjust the pipe and movable member on the stationary member with one hand and when properly adjusted can set up the screw 13 by a suitable tool in the other hand. It will also be observed that the hanger comprises a minimum number of parts, to wit:— the stationary tubular member, the movable member and the screw or bolt for clamping said members together, and that said parts are easily accessible for putting up or taking down the hanger.

The movable member and the pipe can be turned by rotating the stationary member on the screw g.

Claims:

1. In a hanger of the class described, in combination, a tubular member provided with longitudinally extended substantially diametrically opposite slots, a movable member comprising a curved body portion to engage the pipe to be supported, and curved arms extended from said body portion and engaging said tubular member and having their curvature in a direction substantially at right angles to the curvature of the body portion, said arms having bosses provided with holes which register with the slots in the tubular member and one of which is provided with a screw-threaded wall, and a screw or bolt extended through the hole in one of said arms through said slots and into engagement with the threaded wall of the other hole, substantially as described.

2. In a hanger of the class described, in combination, a tubular member provided with substantially diametrically opposite slots having one end wall split to permit said tubular member to be contracted in diameter, a movable member having a body portion to engage the pipe and provided with arms to engage said tubular member, and means to clamp said arms to said tubular member, substantially as described.

3. In a hanger of the class described, in combination, a tubular member made from a sheet metal blank provided at the ends of its opposite sides with lugs which coöperate in the tubular member to form the split end walls of longitudinally extended slots, a movable member provided with a substantially circular body portion and having curved arms to engage said tubular member, said arms having holes which register with said slots, and a screw or bolt to clamp the movable member to the tubular member, substantially as described.

4. In a hanger of the class described, in combination, a tubular member provided with substantially diametrically opposite slots having one end wall split to permit said tubular member to be contracted in diameter, a movable member having a body portion to engage the pipe and provided with curved arms to engage the said tubular member, said arms having openings which register with the slots in the tubular member, and a screw or bolt extended through an opening in one of said arms, through the said slots and into an opening in the other of said arms, substantially as described.

5. In a hanger of the class described, in combination, a tubular member provided with substantially diametrically opposite longitudinally extended slots, a movable member provided with a body portion having arms to engage said tubular member and provided with holes, the annular wall of one of said holes being inturned and screw-threaded, and a screw or bolt extended through the slots in the tubular member for clamping said arms to said tubular member, substantially as described.

6. In a hanger of the class described, in combination, a tubular member provided with substantially diametrically opposite slots, a movable member having a curved body portion to engage the pipe and provided with arms curved transversely with relation to the curved body portion to conform to and engage said tubular member and provided with bosses having holes registering with said slots, and a screw or bolt extended through said holes and slots to clamp said arms to said tubular member, said holes being of substantially the diameter of said screw or bolt to cause the latter to move with the arms when the movable member is adjusted with relation to the slotted tubular member.

7. In a hanger of the class described, in combination, a tubular member provided with substantially diametrically opposite slots, a movable member having a curved body portion to engage the pipe and provided with arms curved transversely with relation to the curved body portion to conform to and engage with said tubular member, said curved arms being of a width greater than said slots to contact with the tubular member on opposite sides of said slots and having holes which register with said slots, the spaces between said arms being bridged by the tubular member, and a screw or bolt extended through said holes and slots to clamp said arms to said tubular member, substantially as described.

In testimony whereof, we have signed our names to this specification in the presence of two subscribing witnesses.

LEWIS A. CARPENTER.
RICHARD MIDDLETON.

Witnesses:
JAS. H. CHURCHILL,
J. MURPHY.